United States Patent
Suzuki et al.

(10) Patent No.: US 8,067,330 B2
(45) Date of Patent: Nov. 29, 2011

(54) CATALYTIC MATERIAL AND CATALYST FOR PURIFYING EXHAUST GAS COMPONENT

(75) Inventors: Kenji Suzuki, Hiroshima (JP); Koichiro Harada, Hiroshima (JP); Hiroshi Yamada, Hiroshima (JP); Kenji Okamoto, Hiroshima (JP); Akihide Takami, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 448 days.

(21) Appl. No.: 12/068,864

(22) Filed: Feb. 12, 2008

(65) Prior Publication Data
US 2008/0207438 A1   Aug. 28, 2008

(30) Foreign Application Priority Data

Feb. 15, 2007 (JP) ................. 2007-035095
Jan. 23, 2008 (JP) ................. 2008-012798

(51) Int. Cl.
*B01J 23/00* (2006.01)
*B01J 23/10* (2006.01)
*B01J 23/42* (2006.01)
*B01J 23/44* (2006.01)

(52) U.S. Cl. .......... 502/302; 502/303; 502/339; 502/349
(58) Field of Classification Search .......... 502/302–304, 502/349, 325, 339; 423/213.2–213.7
See application file for complete search history.

(56) References Cited

U.S. PATENT DOCUMENTS

| | | | |
|---|---|---|---|
| 5,597,771 A | 1/1997 | Hu et al. | |
| 5,948,723 A * | 9/1999 | Sung | 502/303 |
| 6,528,029 B1 * | 3/2003 | Dettling et al. | 423/210 |
| 6,797,668 B2 * | 9/2004 | Yoshikawa | 502/304 |
| 2002/0013226 A1 * | 1/2002 | Maunula | 502/302 |
| 2002/0107141 A1 * | 8/2002 | Yoshikawa | 502/304 |
| 2005/0119117 A1 | 6/2005 | Yoshida et al. | |
| 2005/0163691 A1 * | 7/2005 | Kelkar et al. | 423/239.1 |
| 2006/0217263 A1 * | 9/2006 | Kawamoto et al. | 502/304 |
| 2006/0263284 A1 * | 11/2006 | Larcher et al. | 423/213.2 |
| 2006/0270549 A1 * | 11/2006 | Sato et al. | 502/302 |
| 2007/0191219 A1 | 8/2007 | Fujita et al. | |

(Continued)

FOREIGN PATENT DOCUMENTS
EP    1818097    8/2007
(Continued)

OTHER PUBLICATIONS

Extended European Search Report issued Jul. 9, 2008 in corresponding European Patent Application No. 08101549.7.

(Continued)

*Primary Examiner* — Stanley Silverman
*Assistant Examiner* — Anthony J Zimmer (57) ABSTRACT

Disclosed is a catalytic material for purifying an exhaust gas component. The catalytic material comprises a composite oxide which contains, as essential components, zirconium (Zr) and neodymium (Nd), and further contains a rare-earth metal R other than cerium (Ce) and neodymium (Nd), wherein each of the zirconium, neodymium and rare-earth metal R constituting the composite oxide is contained, in the form of oxide, in such a manner that a ratio of $Nd_2O_3/(ZrO_2+Nd_2O_3+RO)$ is 3 mol % or more, and a ratio of $(Nd_2O_3+RO)/(ZrO_2+Nd_2O_3+RO)$ is 33 mol % or less. The catalytic material of the present invention can oxidize/burn PM in a short period of time, while suppressing CO emission during the burning of the PM, and can achieve further enhanced NOx conversion performance.

2 Claims, 10 Drawing Sheets

U.S. PATENT DOCUMENTS

2007/0196245 A1    8/2007   Fujita et al.
2007/0264486 A1*  11/2007   Verdier .................. 428/315.5
2007/0274890 A1*  11/2007   Minoshima et al. ....... 423/213.5
2007/0293393 A1*  12/2007   Okamoto ................... 502/304

FOREIGN PATENT DOCUMENTS

| | | |
|---|---|---|
| EP | 1820561 | 8/2007 |
| EP | 1 840 087 | 10/2007 |
| EP | 1 870 378 | 12/2007 |
| EP | 1 911 514 | 4/2008 |
| EP | 2 045 011 A1 | 4/2009 |
| FR | 2 868 768 | 10/2005 |
| JP | 2004-174490 | 6/2004 |
| JP | 2005-262184 | 9/2005 |
| JP | 2007-54713 | 3/2007 |
| JP | 2007-83224 | 4/2007 |
| WO | 98/13139 | 4/1998 |
| WO | WO 2006030120 A1 * | 3/2006 |
| WO | 2006/064809 | 6/2006 |
| WO | 2006/134976 | 12/2006 |

OTHER PUBLICATIONS

European Office Action dated Jul. 29, 2010 and issued in corresponding European Patent Application 08 101 549.7.

* cited by examiner

- ⊘ OXYGEN ION
- ⊘ OXYGEN-ION VACANCY
- ● SUBSTITUTED METAL ION
- ○ $ZrO_2$ ION

Fig.6

| | Nd$_2$O$_3$/(ZrO$_2$+Nd$_2$O$_3$+RO) (OXIDE mol%) | RO/(ZrO$_2$+Nd$_2$O$_3$+RO) (OXIDE mol%) | R | CARBON BURNING SPEED (g/hr) at 590°C | CO GENERATION AMOUNT (ppm) |
|---|---|---|---|---|---|
| COMPARATIVE EXAMPLE 1 | 3.0 | 0.0 | — | 0.60 | — |
| COMPARATIVE EXAMPLE 2 | 8.0 | 0.0 | — | 0.67 | — |
| COMPARATIVE EXAMPLE 3 | 12.0 | 0.0 | — | 0.70 | — |
| COMPARATIVE EXAMPLE 4 | 20.0 | 0.0 | — | 0.71 | — |
| INVENTIVE EXAMPLE 1 | 3.0 | 6.0 | La | 0.71 | — |
| INVENTIVE EXAMPLE 2 | 3.0 | 12.0 | La | 0.71 | — |
| INVENTIVE EXAMPLE 3 | 3.0 | 18.0 | La | 0.80 | — |
| INVENTIVE EXAMPLE 4 | 6.0 | 6.0 | La | 0.72 | — |
| INVENTIVE EXAMPLE 5 | 6.0 | 12.0 | La | 0.72 | — |
| INVENTIVE EXAMPLE 6 | 12.0 | 3.0 | La | 0.74 | — |
| INVENTIVE EXAMPLE 7 | 12.0 | 6.0 | La | 0.79 | — |
| INVENTIVE EXAMPLE 8 | 12.0 | 12.0 | La | 0.75 | — |
| INVENTIVE EXAMPLE 9 | 18.0 | 6.0 | La | 0.78 | — |
| INVENTIVE EXAMPLE 10 | 18.0 | 12.0 | La | 0.77 | — |
| INVENTIVE EXAMPLE 11 | 3.0 | 6.0 | Pr | 0.71 | — |
| INVENTIVE EXAMPLE 12 | 3.0 | 18.0 | Pr | 0.80 | — |
| INVENTIVE EXAMPLE 13 | 6.0 | 6.0 | Pr | 0.73 | — |
| INVENTIVE EXAMPLE 14 | 6.0 | 12.0 | Pr | 0.78 | — |
| INVENTIVE EXAMPLE 15 | 12.0 | 3.0 | Pr | 0.72 | — |
| INVENTIVE EXAMPLE 16 | 12.0 | 6.0 | Pr | 0.74 | — |
| INVENTIVE EXAMPLE 17 | 12.0 | 12.0 | Pr | 0.82 | 4 |
| INVENTIVE EXAMPLE 18 | 18.0 | 18.0 | Pr | 0.87 | 5 |
| INVENTIVE EXAMPLE 19 | 12.0 | La:3.0, Pr:12.0 | La, Pr | 0.87 | 5 |
| INVENTIVE EXAMPLE 20 | 12.0 | La:3.0, Pr:18.0 | La, Pr | 1.10 | 8 |
| INVENTIVE EXAMPLE 21 | 18.0 | 12.0 | Pr | 0.91 | 6 |
| INVENTIVE EXAMPLE 22 | 3.0 | 6.0 | Y | 0.71 | — |
| INVENTIVE EXAMPLE 23 | 3.0 | 6.0 | Yb | 0.72 | — |
| INVENTIVE EXAMPLE 24 | 3.0 | 6.0 | Sc | 0.73 | — |
| INVENTIVE EXAMPLE 25 | 3.0 | 6.0 | Sm | 0.71 | — |
| INVENTIVE EXAMPLE 26 | 3.0 | La:3.0, Pr:3.0 | La, Pr | 0.73 | — |

| | Zr-RARE-EARTH METAL COMPOSITE OXIDE | LEAN NOx CONVERSION EFFICIENCY (%) | | |
|---|---|---|---|---|
| | | 200°C | 250°C | 300°C |
| COMPARATIVE EXAMPLE A | Zr-12Nd | 63.5 | 87.8 | 92.3 |
| COMPARATIVE EXAMPLE B | Zr-20Nd | 63.6 | 86.6 | 92.0 |
| COMPARATIVE EXAMPLE C | Zr-20Pr | 63.6 | 85.9 | 91.4 |
| COMPARATIVE EXAMPLE D | Zr-1Nd-8La | 64.1 | 86.0 | 91.6 |
| INVENTIVE EXAMPLE A | Zr-3Nd-6La | 65.7 | 88.2 | 93.1 |
| INVENTIVE EXAMPLE B | Zr-12Nd-12La | 67.5 | 89.2 | 93.5 |
| INVENTIVE EXAMPLE C | Zr-12Nd-12Pr | 66.7 | 88.9 | 94.1 |
| INVENTIVE EXAMPLE D | Zr-12Nd-18Pr | 70.6 | 90.3 | 94.9 |
| INVENTIVE EXAMPLE E | Zr-12Nd-18Pr-3La | 64.1 | 91.0 | 95.3 |

CATALYTIC MATERIAL AND CATALYST FOR PURIFYING EXHAUST GAS COMPONENT

RELATED APPLICATION

This application is based on Japanese Patent Applications Nos. 2007-35095 and 2008-12798, the contents of which are incorporated herein by references.

BACKGROUND OF THE INVENTION

The present invention relates to an exhaust gas component purifying catalytic material, and an exhaust gas component purifying catalyst which comprises a catalyst support substrate having thereon a catalyst layer containing the exhaust gas component purifying catalytic material.

In vehicles, such as automobiles, an exhaust gas component purifying catalyst is provided in an exhaust gas passage of an engine to purify exhaust gas discharged from the engine. Particularly, an exhaust gas component purifying catalyst for a vehicle equipped with a diesel engine or a lean-burn gasoline engine is required to have a function of minimizing unburned carbon particulates (so-called "particulate matter (PM)") and nitrogen oxides (NOx) contained in exhaust gas.

For instance, on concern that unburned carbon particulates (so-called "particulate matter (PM)") contained in exhaust gas of a diesel engine lead to environmental pollution, particulate matter emissions allowances are regulated by law. For complying with the regulations, a diesel particulate filter (DPF) is provided in an exhaust gas passage of a diesel engine-mounted vehicle. The DPF is made of a heat-resistant ceramic material, such as silicon carbide (SiC) or cordierite, and formed in a given structure, called "three-dimensional mesh type" or "wall flow type", so that PM in exhaust gas is trapped in the DPF during the course of passing therethrough.

Under engine operating conditions, trapped PM will be gradually accumulated in the DPF along with an operating time to cause an increase in exhaust back pressure, leading to problems, such as a decrease in engine power and in fuel economy. As measures therefor, there has been known a technique of supplying an excessive amount of HC component (e.g., fuel) from an upstream side of an exhaust gas passage, and burning the HC component by a catalyst disposed upstream of the DPF to increase a temperature of the DPF based on heat from the burning, so as to promote light-off and burning of the PM. In late years, it has also been proposed to provide a catalyst layer containing an oxygen-absorbing material together with alumina and others, on a surface of an exhaust-gas path in the DPF, so as to effectively promote the light-off and burning of the PM through the use of an oxygen component absorbed and stored in the oxygen-absorbing material.

The oxygen-absorbing material has a property capable of absorbing and storing oxygen in exhaust gas when an exhaust atmosphere is in an oxygen-excess state, and releasing the oxygen stored therein when the exhaust atmosphere is in an oxygen-deficient state (so-called "oxygen absorbing/releasing capability") Based on this property, an air/fuel ratio (A/F) range allowing for purification of HC, CO and NOx is expanded to provide is enhanced exhaust gas purification performance (i.e., enhanced exhaust gas conversion performance).

Heretofore, a composite oxide containing Ce and Zr has been known as the oxygen-absorbing material. Concerning this type of composite oxide, for example, in JP2004-174490A, the applicant of this application has proposed an oxygen-absorbing material having a catalytic metal (exactly, catalytic noble metal) arranged at a lattice position or an interlattice position of a crystal structure thereof, and an exhaust gas purifying catalyst comprising this oxygen-absorbing material. Specifically, the JP 2004-174490A discloses a technique of arranging a catalytic noble metal at a lattice position or an interlattice position of a crystal structure of a composite oxide containing Ce and Zr. This technique makes it possible to provide enhanced oxygen absorbing/releasing capability while preventing sintering of the catalytic noble metal and thereby maintain a high conversion performance over a long period of time. The JP2004-174490A also discloses an oxygen-absorbing material containing neodymium (Nd) in addition to the Ce, Zr and a catalytic noble metal.

The applicant has also proposed a catalyst in a catalyst layer formed on the wall surface of an exhaust gas flow path of DPF comprising a catalytic noble metal for oxidizing/burning PM, and a composite oxide free of Ce, wherein the composite oxide contains Zr and a rare-earth metal Y (e.g., yttrium), to act as an oxygen ion-conducting material (see, for example, JP2005-262184A). Differently from the aforementioned oxygen-absorbing material, when a difference in oxygen-concentration occurs around grains of the oxygen ion-conducting material in the catalyst, oxygen ions are transferred from a first region having a relatively high oxygen concentration to a second region having a relatively low oxygen concentration through the grains, and active oxygen is released from the second region. This makes it possible to facilitate expanding a burnable region after generation of a flame kernel for oxidizing/burning PM, so as to efficiently oxidize/burn the PM.

On concern that NOx contained in exhaust gas of a diesel engine or a lean-burn gasoline engine designed to perform combustion in an oxygen-excess state lead to environmental pollution, NOx emissions allowances are also regulated by law. As one of the measures for complying with the regulations, there has been a technique of providing a NOx absorbing/reducing catalyst in an exhaust gas passage of a diesel engine or a lean-burn gasoline engine to purify NOx contained in exhaust gas, in such a manner as to absorb NOx contained in exhaust gas, in the NOx absorbing/reducing catalyst, during lean exhaust gas conditions in a normal engine operation, and temporarily create a rich exhaust gas condition to reduce the NOx absorbed in the NOx absorbing/reducing catalyst.

The NOx absorbing/reducing catalyst involves a problem about deterioration in catalytic performance due to a reaction with sulfur components contained in fuel. As one example of a measure against this problem, JP 2006-043533A discloses a technique of catalytically reducing nitrogen oxides even in the presence of sulfur oxides, using a catalyst which comprises an oxide catalytic component consisting of: ceria, or praseodymium oxide, or a mixed oxide or composite oxide of at least two elements selected from the group consisting of cerium, zirconium, praseodymium, neodymium, terbium, samarium, gadolinium and lanthanum.

In cases where a particulate filter is provided in a vehicle equipped with a diesel engine or a lean-burn gasoline engine, measures are often taken to promote the burning of PM in such a manner that an oxidation catalyst for oxidizing HC and others is disposed upstream of the particulate filter, and a given amount of fuel controllably increased by so-called "post injection" (i.e., an additional injection subsequent to first injection(s), called "pilot injection") is burned in the oxidation catalyst to increase a temperature of exhaust gas to be introduced into the particulate filter. In this case, an extra amount of fuel is inevitably consumed by the oxidation/burning of the PM. Thus, there remains the need for developing a composite oxide capable of achieving a higher PM burning speed than that in the composite oxide containing Zr and a rare-earth metal Y, as disclosed in the JP 2005-262184A, so as to minimize an increase of the fuel. Further, as an amount of PM to be burned increases, an amount of carbon monoxide (CO) emission is likely to undesirably increase due to occurrence of incomplete burning of the PM. Thus, it is necessary to take measures against the incomplete burning of the PM.

In addition to the need for minimizing PM, a vehicle equipped with a diesel engine or a lean-burn gasoline engine is expected to further enhance NOx conversion performance. Although the JP 2006-043533A discloses a catalyst adapted to catalytically reduce nitrogen oxides, there remains a need for developing a composite oxide capable of achieving further enhanced conversion performance of NOx in exhaust gas.

SUMMARY OF THE INVENTION

In view of the above technical problems, it is an object of the present invention to provide an exhaust gas component purifying catalytic material, and an exhaust gas component purifying catalyst, capable of oxidizing/burning PM in a short period of time, while suppressing CO emission during the burning of the PM, and achieving further enhanced NOx conversion performance.

In order to achieve this object, according to a first aspect of the present invention, it is provided a catalytic material for purifying an exhaust gas component. The catalytic material includes a composite oxide which contains, as essential components, zirconium (Zr) and neodymium (Nd), and further contains a rare-earth metal R other than cerium (Ce) and neodymium (Nd), wherein each of the zirconium, neodymium and rare-earth metal R constituting the composite oxide is contained, in the form of oxide, in such a manner that a ratio of $Nd_2O_3/(ZrO_2+Nd_2O_3+RO)$ is 3 mol % or more, and a ratio of $(Nd_2O_3+RO)/(ZrO_2+Nd_2O_3+RO)$ is 33 mol % or less.

According to a second aspect of the present invention, in the catalytic material according to the first aspect of the present invention, the rare-earth metal R may be contained in the form of oxide, in such a manner that a ratio of $RO/(ZrO_2+Nd_2O_3+RO)$ is 12 mol % or more.

According to a third aspect of the present invention, in the catalytic material according to the first or second aspect of the present invention, the rare-earth metal R may be at least one selected from the group consisting of yttrium (Y), ytterbium (Yb), scandium (Sc), lanthanum (La), praseodymium (Pr) and samarium (Sm).

According to a fourth aspect of the present invention, it is also provided a catalyst for purifying an exhaust gas component. The catalyst includes a catalyst support substrate having thereon a catalyst layer which contains the composite oxide according to any one of the first to third aspects of the present invention, and a catalytic metal.

According to a fifth aspect of the present invention, in the catalyst according to the fourth aspect of the present invention, the catalyst support substrate may be a particulate filter.

According to a sixth aspect of the present invention, in the catalyst according to the fourth or fifth aspect of the present invention, the catalyst layer may consist of a plurality of layers which include an upper layer facing an exhaust gas channel and a lower layer located under the upper layer, wherein at least the lower layer contains the composite oxide, and each of the plurality of layers contains an oxide particle having a high specific surface area, platinum (Pt) serving as the catalytic metal, and a NOx trapping material adapted to trap NOx, whereby the catalyst is operable to trap NOx contained in the exhaust gas, during lean exhaust gas conditions where exhaust gas has an excess oxygen concentration.

According to a seventh aspect of the present invention, in the catalyst according to the sixth aspect of the present invention, the upper layer in the plurality of layers further contains rhodium (Rh), wherein the rhodium and the platinum are supported by the oxide particle contained in the upper layer.

The catalytic material according to the first aspect of the present invention employs a Zr—Nd—R based composite oxide containing zirconium, neodymium and a rare-earth metal R other than cerium (Ce) and neodymium (Nd), in the form of oxide, in such a manner that a ratio of $Nd_2O_3/(ZrO_2+Nd_2O_3+RO)$ is 3 mol % or more, and a ratio of $(Nd_2O_3+RO)/(ZrO_2+Nd_2O_3+RO)$ is 33 mol % or less. Thus, as compared with a binary composite oxide containing zirconium (Zr), and neodymium or other rare-earth metal, the catalyst material can oxidize/burn carbon particulates in a shorter period of time while effectively suppressing CO emission during burning of the carbon particulates. The Zr—Nd—R based composite oxide has a low decreasing rate of a BET specific surface area. This makes it possible to prevent a supported catalytic noble metal from sinking down into the composite oxide, and maintain a crystal configuration thereof even during high-temperature aging so as to obtain further enhanced catalytic function contributing to an exhaust gas conversion reaction and thereby achieve further enhanced exhaust gas conversion performance. The catalytic material has a high oxygen absorbing/releasing capability in a catalytically effective temperature range, which is different from that of a conventional ceria-containing oxygen-absorbing material, as will be clarified by after-mentioned data, and therefore can also be used in a three-way catalyst and a lean NOx catalyst.

The catalytic material according to the second aspect of the present invention can more reliably achieve the same effects as those of the catalytic material according the first aspect of the present invention.

The catalytic material according to the third aspect of the present invention can more reliably achieve the same effects as those of the catalytic material according to the first aspect of the present invention.

The catalyst according to the fourth aspect of the present invention can achieve the same effects as those of the catalytic material according to the first aspect of the present invention.

In the catalyst according to the fifth aspect of the present invention, the composite oxide according to any one of the first to third aspects of the present invention and a catalytic metal are contained in a catalyst layer on a particulate filter. Thus, the catalyst can achieve the same effects as those of the catalytic material according to the first aspect of the present invention.

In the catalyst according to the sixth aspect of the present invention, the composite oxide is contained in at least the lower layer located under the upper layer facing the exhaust gas channel, and an oxide particle with a high specific surface area, platinum and a NOx trapping material are contained in each of the plurality of layers. This makes it possible to effectively purify NOx during lean exhaust gas conditions, so as to reliably obtain the above effects. The composite oxide contained in the lower layer is excellent in oxygen exchange reaction during lean exhaust gas conditions, and thereby can promote an oxidation reaction of NOx to be trapped. In addition, the composite oxide having base properties can easily incorporate NOx and effectively trap the NOx. In a process of reducing tapped NOx during rich exhaust gas conditions, an amount of oxygen to be released from the composite oxide is less than that to be released from a Ce-based composite oxide. This makes it possible to effectively purify the NOx without hindering the NOx reduction reaction.

In the catalyst according to the seventh aspect of the present invention, the rhodium and the platinum are supported by the oxide particle contained in the upper layer. Thus, in a process of de-trapping NOx trapped in the lower layer located under the upper layer, most of the NOx will pass through the upper layer. This makes it possible to promote effective reduction/conversion of the de-tapped NOx, based on the Rh capable of promoting a NOx reduction reaction, so as to further reliably obtain the above effects.

BRIEF DESCRIPTION OF THE DRAWINGS

Various characteristics and advantages of the present invention will become clear from the following description taken in conjunction with the preferred embodiments with reference to the accompanying drawings throughout which like parts are designated by like reference numerals.

DETAILED DESCRIPTION OF THE PREFERRED EMBODIMENTS

With reference to the accompanying drawings, embodiments of the present invention will now be described.

Figure 1:
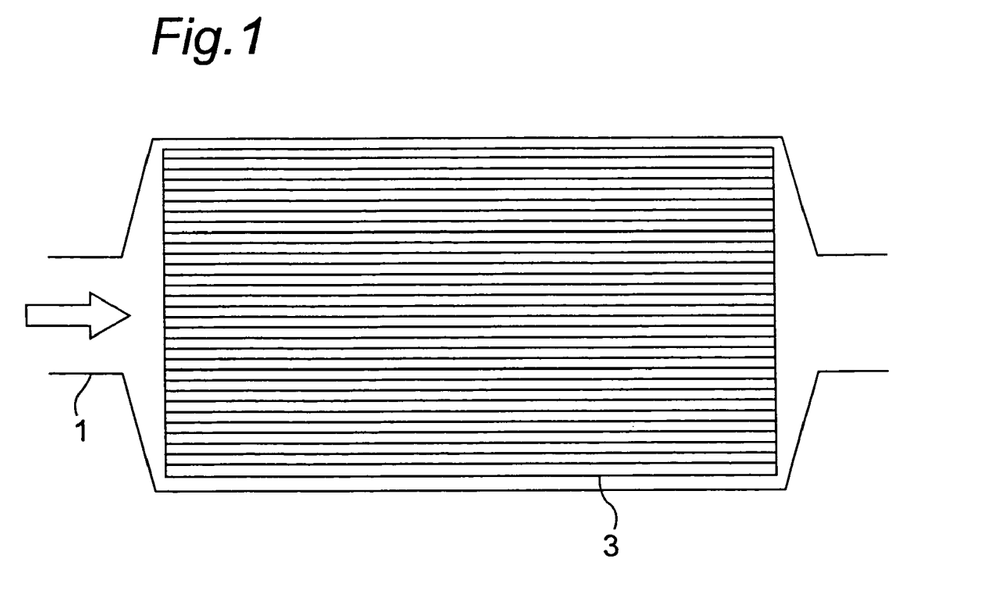
FIG. 1 is a schematic diagram showing a DPF with an oxidation catalyst, according to one embodiment of the present invention, wherein the DPF is assembled to an exhaust passage of a diesel engine.

FIG. 1 shows a DPF 3 according to one embodiment of the present invention, wherein the DPF 3 is assembled to an exhaust passage 1 of a diesel engine. In FIG. 1, an exhaust pipe defining the exhaust passage 1 has an upstream end (on a right side in FIG. 1) connected to a diesel engine body (not shown) through an exhaust manifold (not shown). Exhaust gas discharged from the diesel engine body flows in a direction indicated by the arrow in FIG. 1.

Figure 2:
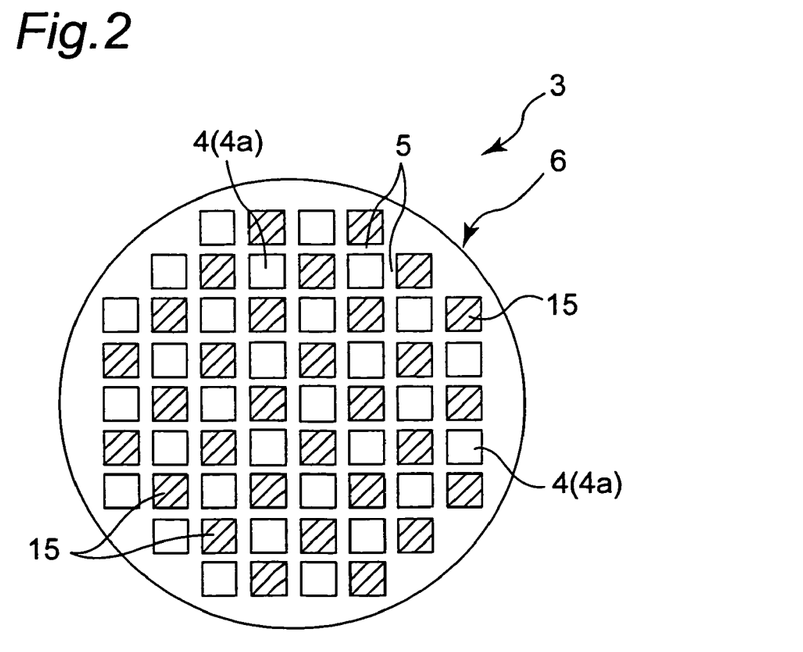
FIG. 2 is a schematic front view showing the DPF.
Figure 3:
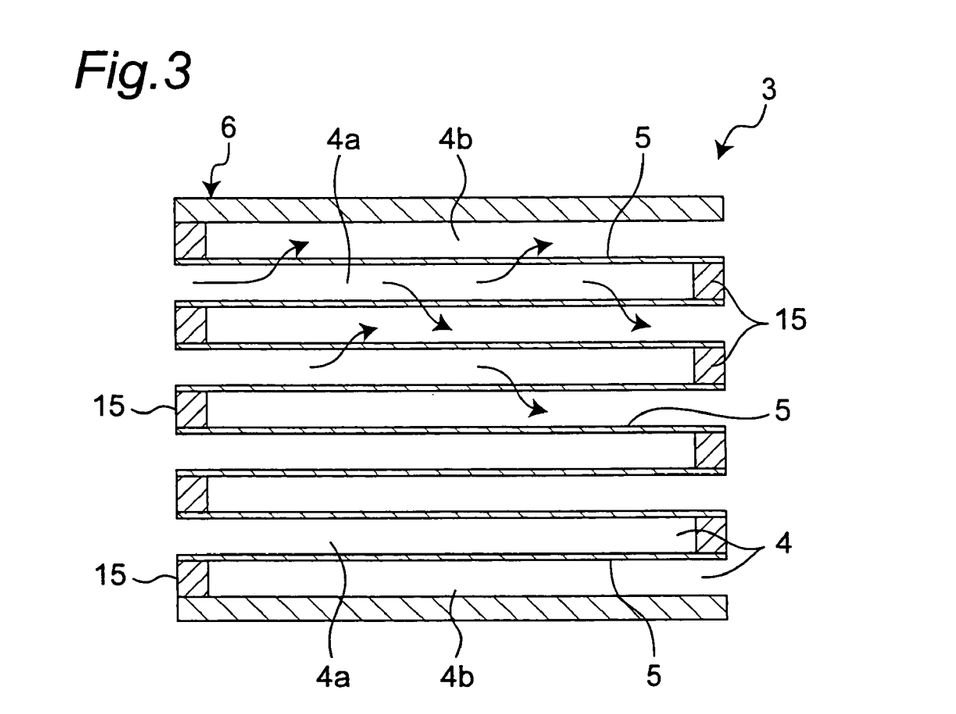
FIG. 3 is a schematic vertical sectional view showing the DPF.

The DPF 3 is mounted in the exhaust passage to trap PM in the exhaust gas. FIGS. 2 and 3 are schematic diagrams showing the DPF 3. In this embodiment, the DPF 3 is a so-called wall-flow type filter formed to have a cylindrical outer shape. Specifically, the DPF 3 comprises a filter body 6 and a plurality of plug members 15. The filter body 6 is made of a heat-resistant ceramic material, such as cordierite, SiC or $Si_3N_4$, and formed in a honeycomb structure which has a plurality of cells (paths) 4 defined by a porous wall 5 having therein a large number of communication holes 5a, to extend in parallel relation to each other along the exhaust passage. The plug members 15 hermetically plug respective upstream ends of a part 4b of the cells 4 and respective downstream ends of the remaining cell 4a in a zigzag manner.

That is, the DPF 3 having the above structure is designed to allow exhaust gas inflowing from respective open upstream ends of the upstream cells 4a to be introduced into the downstream cells 4b through the porous walls 5 and then discharged outside through respective open downstream end of the downstream cells 4b, and trap PM in the exhaust gas during the course of passing through the porous walls 5. In place of the honeycomb-structured filter body 6 of the DPF 3, a conventional support (i.e., filter body) made of a heat-resistant material, such as silicon carbide, and formed in a three-dimensional mesh structure, may be employed.

Figure 4:
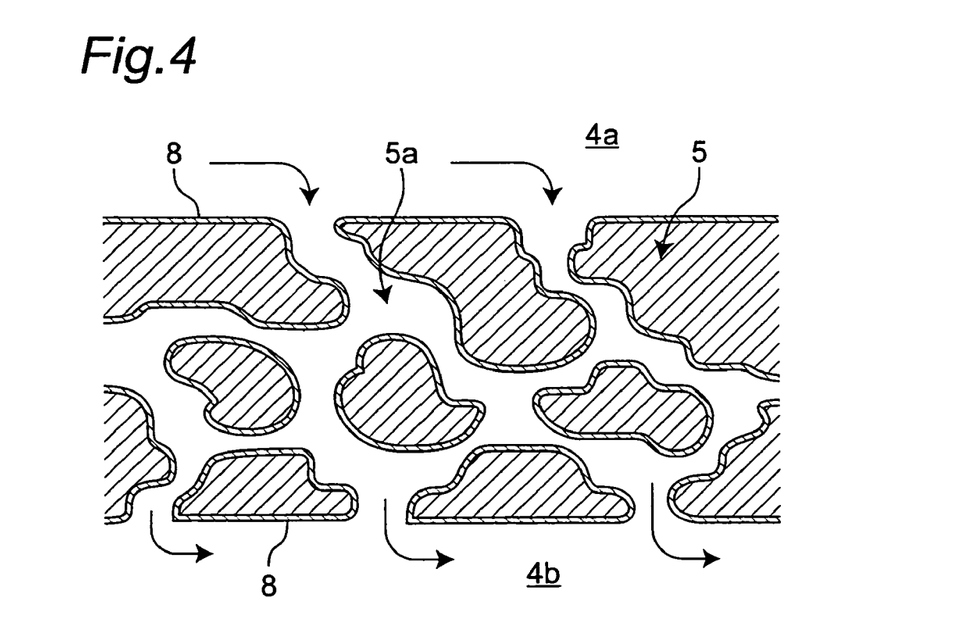
FIG. 4 is an enlarged sectional view showing a porous wall of the DPF.

FIG. 4 is an enlarged sectional view showing the porous wall 5. As shown in FIG. 4, the DPF 3 has an internal flow channel for allowing exhaust gas to pass therethrough, and an inner-wall surface defining the internal flow channel is coated with a particulate oxidation catalyst for burning PM, so that an oxidation catalyst layer 8 is formed on the inner-wall surface. In this embodiment, the particulate oxidation catalyst contains: a catalytic noble metal, such as platinum (Pt), palladium (Pd) or rhodium (Rh), for burning PM, a zirconium-neodymium-rare-earth metal R based composite oxide (hereinafter referred to as "Zr—Nd—R based composite oxide") containing zirconium (Zr), neodymium (Nd), and a rare-earth metal R other than cerium (Ce) and neodymium (Nd); and alumina ($Al_2O_3$), wherein each of the Zr—Nd—R based composite oxide and the alumina serves as a support for supporting the catalytic noble metal. In view of heat resistance, the alumina is preferably stabilized alumina doped with a rare-earth metal, such as La. In view of preventing sintering the catalytic noble metal, the alumina preferably has a specific surface area of 250 $m^2$/g or more.

In use of a mixture of the Zr—Nd—R based composite oxide and the alumina, each of the Zr—Nd—R based composite oxide and the alumina is preferably contained in the range of 10 to 150 g/L. Specifically, if the Zr—Nd—R based composite oxide is contained in an amount less than the above range, the PM burning function will become insufficient. If the alumina is contained in an amount less than the above range, a degree of dispersion of the supported catalytic noble metal will be lowered to cause deterioration in light-off performance and insufficiency in improvement degree of carbon-monoxide conversion performance. Further, if each of the Zr—Nd—R based composite oxide and the alumina is contained in an amount greater than the above range, an exhaust back pressure will be excessively increased when particulates are tapped and accumulated by/in the DPF 3. After the catalytic noble metal is supported on each of the alumina and the Zr—Nd—R based composite oxide by a predetermined amount, the inner-wall surface of the DPF 3 is coated with a mixture of the alumina and the Zr—Nd—R based composite oxide each supporting the catalytic noble metal. The oxidation catalyst layer 8 comprised of the particulate oxidation catalyst may be formed over an entire region of the internal flow channel of the filter body 6, or may be formed on a part of the inner-wall surface defining an upstream region of the internal flow channel, particularly, defining the upstream cells 4a and the communication holes 5a.

For example, the catalytic noble metal is at least one selected from the group consisting of platinum (Pt), palladium (Pd) and rhodium (Rh). As one example, when platinum (Pt) is used as the catalytic noble metal, a nitric acid solution of dinitrodiamine platinum is added and mixed in/with the composite oxide, and platinum in the solution is supported on the composite oxide by a process of evaporation to dryness. The catalytic noble metal, e.g., platinum (Pt) as in an after-mentioned example, is supported on each of the Zr—Nd—R based composite oxide and the alumina. When platinum (Pt) is used as the catalytic noble metal, an amount of the catalytic noble metal to be supported on the composite oxide may be adjusted based on a concentration or amount of the nitric acid solution of dinitrodiamine platinum. The catalytic noble metal to be supported on each of the composite oxide and the alumina may be any suitable catalytic noble metal other than Pt, Pd and Rh.

The reason why the Zr—Nd—R based composite oxide contains Zr and Nd as essential components will be described below. The following Table 1 shows respective BET specific surface areas of three types of composite oxides after being subjected to a heat treatment, specifically respective BET specific surface areas of three types of zirconium-based composite oxides ($ZrO_2$-8 mol % $Nd_2O_3$, $ZrO_2$-8 mol % $Y_2O_3$, and $ZrO_2$-8 mol % $Yb_2O_3$) after being subjected to a heat treatment under an ambient atmosphere at respective temperatures.

TABLE 1

| Condition of heat treatment | BET specific surface area ($m^2/g$) | | |
|---|---|---|---|
| | Zr—8Nd | Zr—8Y | Zr—8Yb |
| 500° C. × 2 h | 106.0 | 109.8 | 108.8 |
| 800° C. × 6 h | 60.4 | 47.5 | 34.7 |
| 1000° C. × 6 h | 34.5 | 13.3 | 6.7 |
| 1200° C. × 6 h | 7.0 | 2.7 | 2.7 |

As seen in Table 1, after the thermal histories, Nd-containing zirconium-based composite oxide has a larger BET specific surface area than that of the Y or Yb-containing zirconium-based composite oxide. The larger BET specific surface means that there are a larger number of pores. This provides advantages of being able to smoothly absorb and release oxygen and suppress sinking-down of the supported catalytic noble metal into the composite oxide so as to obtain enhanced catalytic function contributing to an exhaust gas conversion reaction and thereby achieve enhanced exhaust gas conversion performance.

The zirconium-neodymium based composite oxide additionally contains a rare-earth metal other than cerium (Ce) and neodymium (Nd) (hereinafter referred to as "additional rare-earth metal"). The additional rare-earth metal to be contained in the zirconium-neodymium based composite oxide is at least one of the rare-earth elements other than cerium (Ce) and neodymium (Nd), i.e., at least one selected from the group consisting of Sc, Y, La, Pr, Pm, Sm, Eu, Gd, Tb, Dy, Ho, Er, Tm, Yb and Lu. Preferably, the additional rare-earth metal is at least one selected from the group consisting of yttrium (Y), ytterbium (Yb), scandium (Sc), lanthanum (La), praseodymium (Pr) and samarium (Sm). The reason for excluding cerium (Ce) from the rare-earth metals to be contained in the composite oxide is that it is difficult for Ce to effectively bring out after-mentioned oxygen ion conductivity because Ce could serve as an electron transfer medium without exhibiting the oxygen ion conductivity, under a specific condition.

The oxidation catalyst layer 8 may be formed by: supporting the catalytic noble metal (e.g., platinum) on each of the Zr—Nd—R based composite oxide and the alumina, in the above manner; mixing the catalytic noble metal-supporting Zr—Nd—R based composite oxide with the catalytic noble metal-supporting alumina; mixing water and binder with the obtained mixture to form a slurry; coating the inner-wall surface of the internal flow channel of the filter body 6 with the slurry; removing an excess part of the slurry through air-blowing; and drying and firing the filter body 6. Dimensions, such as a layer thickness, of the oxidation catalyst layer 8, can be adjusted by controlling a viscosity and/or a concentration of the slurry.

Figure 5:
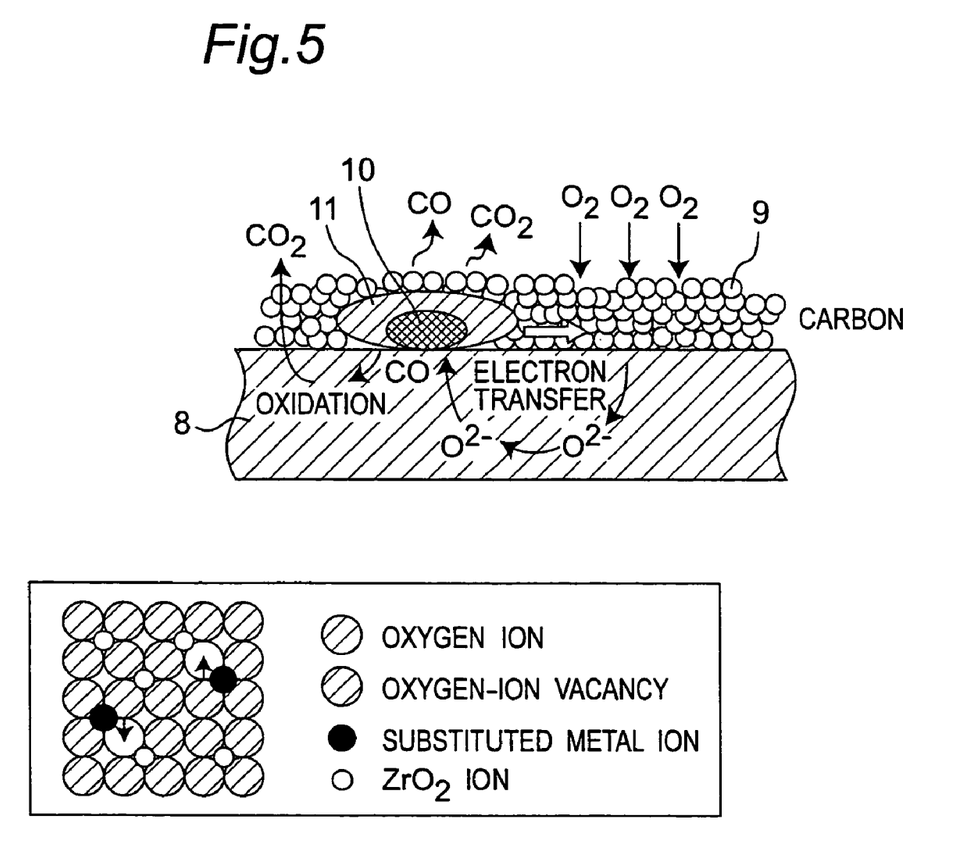
FIG. 5 is an explanatory diagram showing a PM burning mechanism.

The Zr—Nd—R based composite oxide contained in the particulate oxidation catalyst has oxygen ion conductivity. A mechanism allowing PM to be oxidized by the particulate oxidation catalyst using the composite oxide having oxygen ion conductivity is considered as follows. FIG. 5 is an explanatory diagram of a PM oxidizing mechanism.

When exhaust gas is discharged from the diesel engine body, PM is trapped in the DPF, and accumulated as carbon particulates 9 on the oxidation catalyst layer 8. The carbon particulate 9 is a porous substance having a high ability to bind with oxygen. Thus, under oxygen-excess conditions, release/desorption of oxygen occurs in a surface region of the oxidation catalyst layer 8 having the carbon particulates 9 accumulated thereon, and thereby an oxygen concentration in the surface region is lowered to cause a microscopic difference in oxygen concentration relative to other region of the oxidation catalyst layer 8.

When an oxygen concentration in a specific surface area of the oxidation catalyst layer 8 is lowered in the above manner, oxygen ions $O^{2-}$ are transferred from an inside of the Zr—Nd—R based composite oxide having a relatively high oxygen concentration, to the specific surface area having the lowered oxygen concentration, because the composite oxide constituting the oxidation catalyst layer 8 has oxygen ion conductivity. The oxygen ions $O^{2-}$ reaching the specific surface area of the oxidation catalyst layer 8 become active oxygen, and thereby an area having a relatively high ability to induce an oxidation reaction of the carbon particulates is locally created in a surface of the oxidation catalyst layer 8.

Then, an oxidation reaction of the carbon particulates 9 is initiated in a region having an optimal reaction condition. In response to initiation of the oxidation reaction, a flame kernel 10 is created, and oxygen around the flame kernel 10 is consumed by the flame kernel 10 to form an oxygen-deficient space 11. Generally, if an oxygen-deficient state occurs, the oxidation reaction, i.e., burning, of the carbon particulates 9, becomes weak, and the flame kernel 10 will be vanished before long. In contrast, the DPF 3 in this embodiment is designed such that the particulate oxidation catalyst constituting the oxidation catalyst layer 8 contains the Zr—Nd—R based composite oxide having oxygen ion conductivity, so that active oxygen is continuously supplied to the oxygen-deficient space 11 by an action of the composite oxide to promote the oxidation reaction of the carbon particulates 9. Thus, a burnable region will be expanded on the basis of the flame kernel 10.

That is, under an oxygen-excess atmosphere, a difference in oxygen concentration between the oxygen-deficient space 11 and the surrounding area occurs to cause an unbalance in electric charge in a microscopic region of the inside of the composite oxide of the oxidation catalyst layer 8, and thereby oxygen ions are transferred from an area having a relatively high oxygen concentration toward the oxygen-deficient space 11 through the Zr—Nd—R based composite oxide. Then, the oxygen ions are released as active oxygen to the oxygen-deficient space 11, and thereby binding/burning between the carbon particulates 9 and the active oxygen, i.e., oxidation of the carbon particulates 9, will be promoted. Thus, a burnable region will be expanded without vanishment of the flame kernel 10 created in a specific surface region of the oxidation catalyst layer 8. This makes it possible to efficiently burn/oxidize the carbon particulates 9, i.e., PM, in a short period of time, and substantially increase a burning speed of the PM.

The rare-earth metals are contained in the Zr—Nd—R based composite oxide. Thus, as shown in FIG. 5, a part of zirconium (Zr) is substituted with neodymium (Nd) and the additional rare-earth metal (these are indicated by the black circle in FIG. 5), and therefore oxygen-ion vacancies exist in the composite oxide to allow oxygen ions to be transferred therethrough. In FIG. 5, the alumina is omitted.

As mentioned above, in an DPF system for an diesel engine, measures are often taken to promote burning of carbon particulates in such a manner that an oxidation catalyst for oxidizing HC and others is disposed upstream of the DPF 3, and a given amount of fuel controllably increased by post injection is burned in the oxidation catalyst to increase a temperature of exhaust gas to be introduced into the DPF 3. In this case, an extra amount of fuel is likely to be consumed by the oxidation/burning of the PM.

The inventors of the present invention have experimentally found out that a catalyst employing the Zr—Nd—R based composite oxide in this embodiment can achieve a further increased burning speed of carbon particulates as compared with a conventional Ce-based composite oxide or a conventional composite oxide containing Zr and a single rare-earth metal Y, and thereby suppress an increase in fuel consumption.

An experimental test for evaluation on PM burning performance of the DPF was carried out to verify the above effects. The result will be described below.

(A) Evaluation Test on Carbon-Particulate Burning Speed

For an evaluation test on a carbon-particulate burning speed in the Zr—Nd—R based composite oxide, a plurality of samples were prepared by changing a composition and a content ratio of the Zr—Nd—R based composite oxide to be contained in an oxidation catalyst layer of a particulate oxidation catalyst. More specifically, twenty six types of inventive samples using the Zr—Nd—R based composite oxide, and four types of comparative samples, were prepared. Then, a carbon-particulate burning speed was experimentally measured under conditions that carbon black used as a substitute for PM were accumulated on respective surfaces of catalyst layers of the inventive and comparative samples, and a temperature at an catalyst inlet was set at 590° C.

In this test, no alumina was mixed with the composite oxide, and the entire catalytic noble metal was supported on the composite oxide to be contained in the oxidation catalyst layer. Further, in this test, a DPF support (filter body 6) for a sample was prepared by cutting out a cylindrical-shaped piece having a volume of 25 ml, from a silicon carbide DPF support having a cell structure with 12 mil wall thickness/300 cpsi (cell per square inch).

(Preparation of Samples)

A process of preparing each of the inventive and comparative samples will be described below.

As the inventive samples using the Zr—Nd—R based composite oxide, total twenty six types of Zr—Nd—R based composite oxides different in a content ratio of a neodymium oxide ($Nd_2O_3$) to a zirconium oxide ($ZrO_2$) and/or a content of an oxide of a rare-earth metal R other than cerium (Ce) and neodymium (Nd) were prepared. As the rare-earth metal R other than cerium (Ce) and neodymium (Nd), either one of the group consisting of yttrium (Y), ytterbium (Yb), scandium (Sc), lanthanum (La), praseodymium (Pr) and samarium (Sm), or a combination of lanthanum (La) and praseodymium (Pr), was employed. An alkaline solution was prepared by dissolving a nitrate salt of each metal in ion-exchanged water and adjusting a pH of the solution using ammonia, and subjected to a falling-drop process to obtain a sediment containing each metal element. Then, the sediment was subjected to filtering, rising with water, drying, and firing at 500° C. for 2 hours to prepare each of the Zr—Nd—R based composite oxides. Subsequently, platinum (Pt) serving as the catalytic noble metal was supported on each of the Zr—Nd—R based composite oxides. The platinum was supported in an amount of 0.5 g per L of the DPF 3, wherein the Zr—Nd—R based composite oxide is contained in an amount of 50 g per L of the DPF 3.

Specifically, a nitric acid solution of dinitrodiamine platinum is added and mixed in/with each powder of the composite oxides different in content of $Nd_2O_3$ and/or RO, and platinum (Pt) in the solution was supported on each of the Zr—Nd—R based composite oxides by a process of evaporation to dryness.

After drying each of the Pt-supporting Zr—Nd—R based composite oxides, the dried Pt-supporting Zr—Nd—R based composite oxide was powdered using a mortar, and the obtained powder was calcinated under an ambient atmosphere at 500° C. for 2 hours in an electric furnace to obtain a Zr—Nd—R based catalytic powder consisting of Pt-supporting Zr—Nd—R based composite oxide (i.e., Pt-supporting composite oxide powder). The obtained Pt-supporting composite oxide powder was mixed with water and binder to form a slurry. The slurry was sucked in the filter body 6 appropriately plugged by the plug members 15, and an excess part of the slurry was removed through air-blowing, so that the slurry was wash-coated on the filter body 6. Then, the slurry on the filter body 6 was dried, and then calcinated at 500° C. for 2 hours in an electric furnace to obtain the twenty six inventive samples each having a different oxidation catalyst layer 8 formed on an approximately entire region of an internal channel of the filter body 6.

As to the comparative samples, platinum (Pt) was supported on each of four types of Zr—Nd oxides devoid of a rare-earth metal other than cerium (Ce) and neodymium (Nd) and different in content of $Nd_2O_3$. Then, in the same manner as that in the above Zr—Nd—R based composite oxide, the obtained Pt-supporting Zr—Nd oxide was slurried, and the slurry was subjected to suction, removal, drying and firing to obtain the four comparative samples each having a different oxide catalyst layer formed on an approximately entire region of an internal channel of the filter body.

(Evaluation Test on Carbon-Particulate Burning Speed)

Each of the samples obtained in the above manner was subjected to an aging treatment under an ambient atmosphere at 800° C. for 24 hours, and each of the aged samples was set in a model-gas flow-type catalyst evaluation apparatus designed to supply model gas as a substitute for exhaust gas, so as to carry out a carbon-particulate burning speed evaluation test for evaluating a carbon-particulate burning speed in each of the aged samples.

In this test, a carbon black powder as a substitute for PM was accumulated on the DPF 3, and the model gas was supplied while increasing a temperature thereof. On this condition, respective concentrations of $CO_2$ and CO generated from burning of the carbon black powder in the DPF 3 was used as an index for determining PM burning performance. In a process of accumulating the carbon black powder, 10 cc of ion-exchanged water was added to a carbon black powder equivalent to 10 g/L, and the obtained slurry was stirred for 5 minutes using a stirrer to sufficiently disperse the carbon black powder over the water. Then, an upstream end of the filter body 6 serving as a DPF support for the sample was immersed in the slurry, and the slurry was sucked from the other end of the filter body 6 on the opposite side of the immersed end using an aspirator. Then, water unremovable through the suction process was removed by blowing air from the side of the immersed end, and then the filter body was dried at 150° C. for 2 hours using a dryer.

In the model-gas flow-type catalyst evaluation apparatus, the model gas was prepared to include each of oxygen gas and water vapor in an amount of 10 volume % with respect to a total flow, NO in an amount of 300 ppm, and nitrogen gas, and supplied at a spatial velocity of 80000/h while increasing a temperature thereof up to 600° C. at a temperature rise rate of 15° C./min. Under these conditions, respective CO and $CO_2$ concentrations just after an outlet of the DPF 3 were measured. Then, a carbon-particulate burning speed defined by the following formula was calculated based on the measured CO and $CO_2$ concentrations. The carbon-particulate burning speed indicates an amount of carbon black powder (carbon particulates) to be burned per the DPF support having a volume of 25 ml.

Carbon-particulate burning speed(g/h)={gas flow volume (L/h)×[(CO+$CO_2$) concentration(ppm)/1×10$^6$]}×12 (g/mol)/ 22.4 (L/mol)

Figure 6:
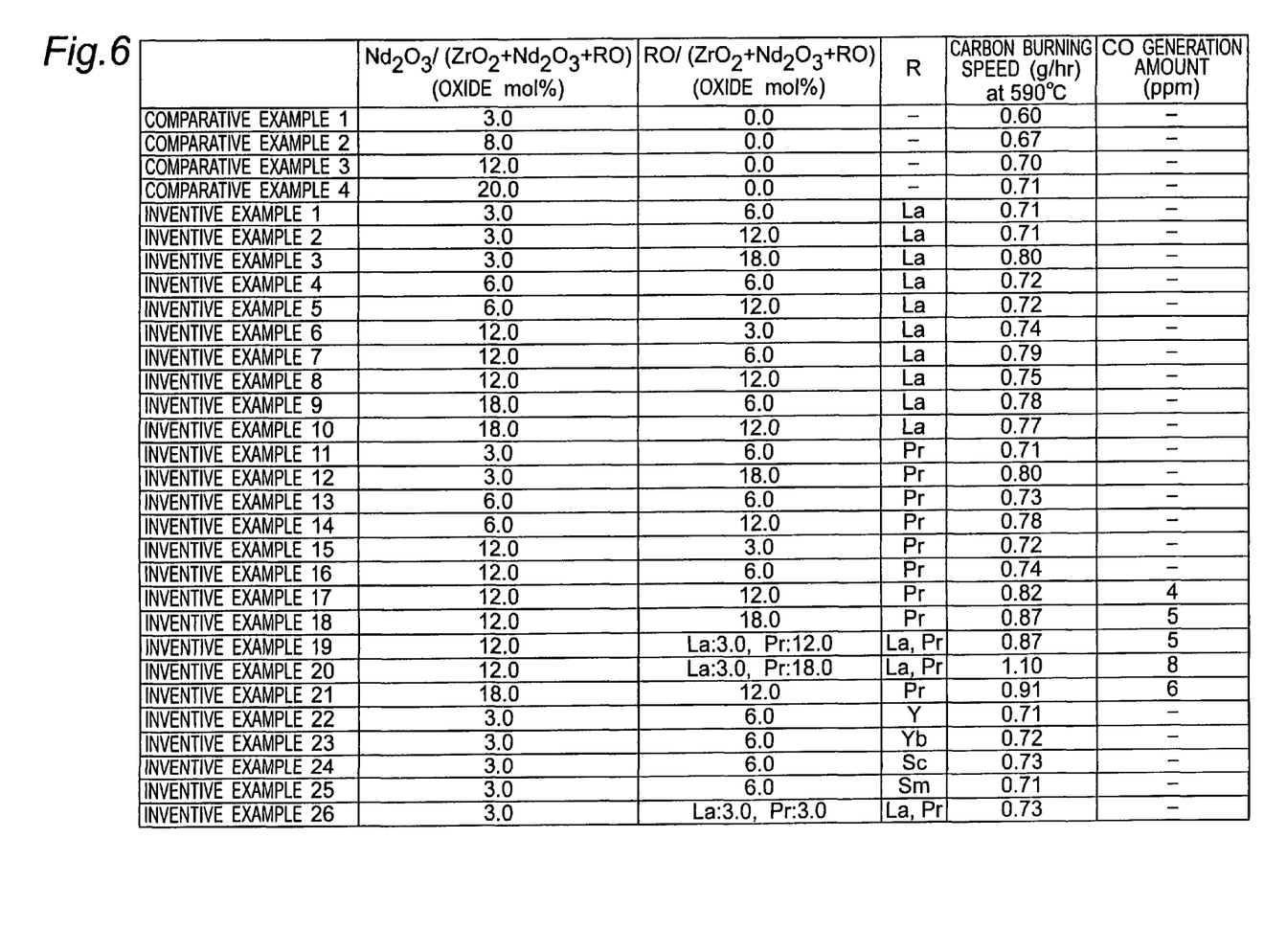
FIG. 6 is a table showing respective carbon burning speeds of various Zr—Nd—R based composite oxides (inventive examples) and Zr—Nd composite oxides (comparative examples).
Figure 7:
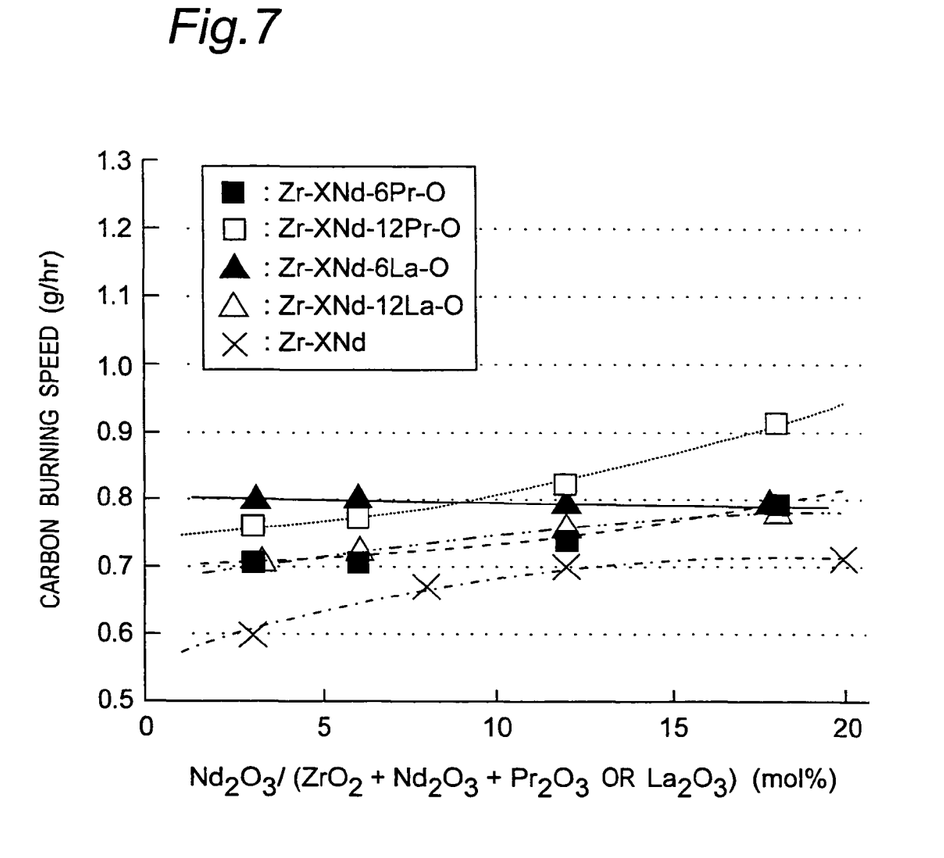
FIG. 7 is a graph showing a change in burning speed resulting from a difference in rare-earth metal R contained in Zr—Nd—R based composite oxide, and a change in a ratio of Nd oxide/Zr—Nd—R based composite oxide or Zr—Nd composite oxide.

FIG. 6 is a table showing the measurement result of carbon-particulate burning speed in each of the inventive samples (Inventive Examples 1 to 26) corresponding to the twenty six types of Zr—Nd—R based composite oxides and the comparative samples (Comparative Examples 1 to 4) corresponding to the four types of Zr—Nd composite oxides. This table also shows a CO generation amount. FIG. 7 is a graph corresponding to the measurement result of carbon-particulate burning speed in FIG. 6, which shows a change in carbon-particulate burning speed resulting from a difference in the additional rare-earth metal R (praseodymium (Pr) or lanthanum (La)) contained in the Zr—Nd—R based composite oxide, and a change in a ratio of Nd oxide/Zr—Nd—R based composite oxide or Zr—Nd composite oxide.

As seen in FIGS. 6 and 7, the inventive samples having the particulate oxidation catalyst comprising the Zr—Nd—R based composite oxide achieved a carbon-particulate burning speed superior to that in the comparative samples using the Zr—Nd composite oxide.

Specifically, a carbon-particulate burning speed superior to that in the comparative samples using the Zr—Nd composite oxide was achieved in the inventive samples where neodymium (Nd) is contained in such a manner that a ratio of $Nd_2O_3/(ZrO_2+Nd_2O_3+RO)$ is 3 mol % or more. As seen in FIG. 6, the ratio of $Nd_2O_3/(ZrO_2+Nd_2O_3+RO)$ is set preferably at 6 mol % or more, more preferably at 12 mol % or more.

In Inventive Example 20 where the ratio of $Nd_2O_3/(ZrO_2+Nd_2O_3+RO)$, a ratio of $La_2O_3/(ZrO_2+Nd_2O_3+La_2O_3)$ and a ratio of $Pr_2O_3/(ZrO_2+Nd_2O_3+Pr_2O_3)$ is 12 mol %, 3 mol % and 18 mol %, respectively, an amount of CO generated during burning of carbon particulates (carbon black powder) is increased as compared with other samples. In view of the tendency of increase in the CO generation amount, it was considered that an undesirable result is caused by setting a ratio of $(Nd_2O_3+RO)/(ZrO_2+Nd_2O_3+RO)$ at a value greater than 33 mol %. In the table of FIG. 6, "-" in the column of "CO generation amount" means that the CO generation amount is less than 1 ppm.

That is, when the zirconium, neodymium and additional rare-earth metal are contained in such a manner that the ratio of $Nd_2O_3/(ZrO_2+Nd_2O_3+RO)$ is 3 mol % or more, and the ratio of $(Nd_2O_3+RO)/(ZrO_2+Nd_2O_3+RO)$ is 33 mol % or less, the carbon particulates 9 can be oxidized/burned in a short period of time while effectively suppressing CO emission during the burning of the carbon particulates.

Further, as seen in FIG. 7, when the additional rare-earth metal R is contained in such a manner that a ratio of $RO/(ZrO_2+Nd_2O_3+RO)$ is 12 mol % or more, the carbon-particulate burning speed, an enhanced carbon-particulate burning speed could be more reliably achieved.

(B) Evaluation Test on Catalyst Properties

In addition to the above evaluation test on carbon-particulate burning performance, the inventors carried out an evaluation test based on X-ray structure analysis for catalyst properties of two types of Zr—Nd—R based composite oxides which contain as the additional rare-earth metal R lanthanum (La) and praseodymium (Pr), respectively.

Figure 8:
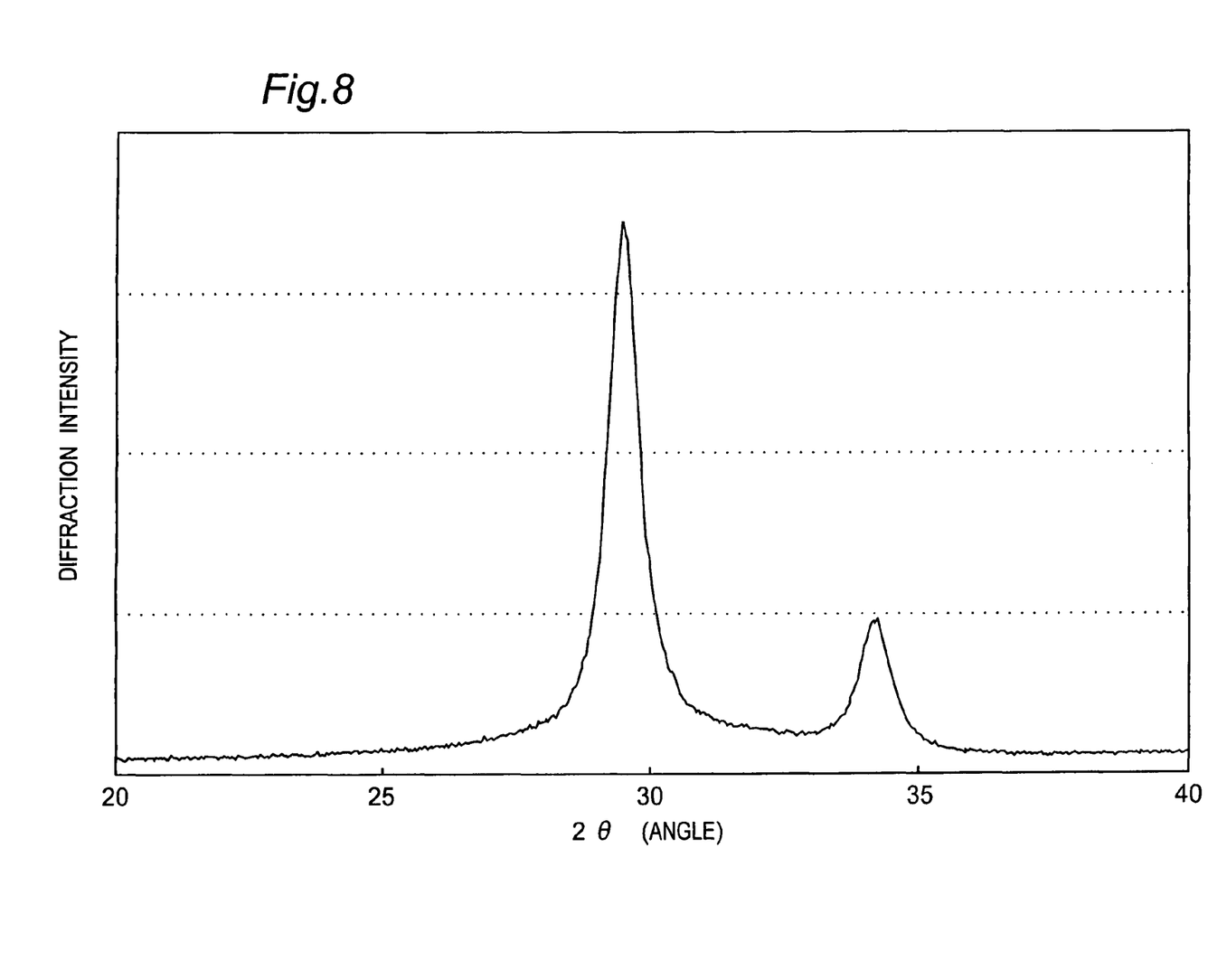
FIG. 8 is a graph showing an X-ray diffraction measurement result for Zr—12Nd—6La.
Figure 9:
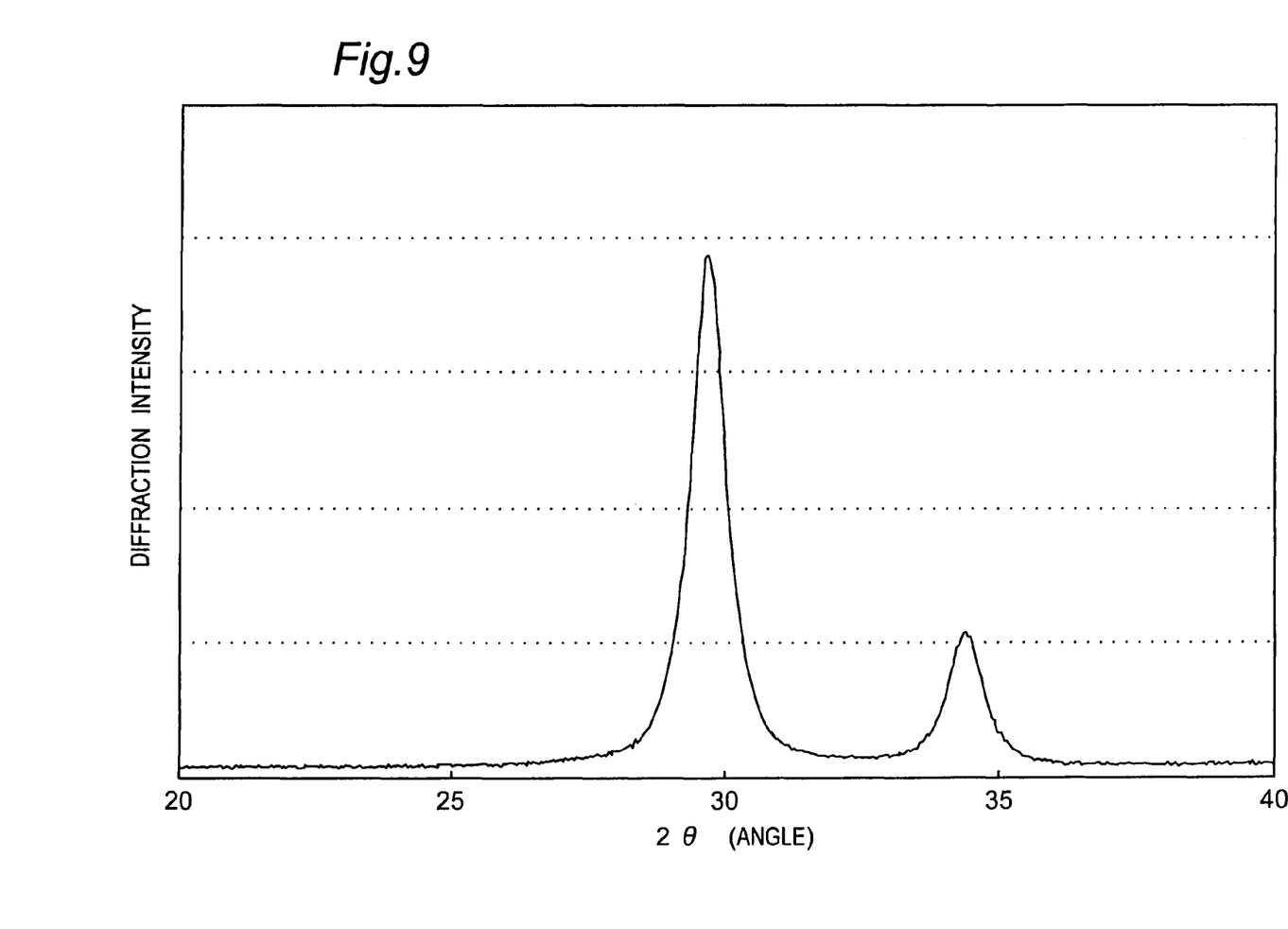
FIG. 9 is a graph showing an X-ray diffraction measurement result for Zr—12Nd—6Pr.

FIGS. 8 and 9 are graphs showing respective X-ray diffraction measurement results for $ZrO_2$-12 mol % $Nd_2O_3$-6 mol % $La_2O_3$ (hereinafter referred to shortly as Zr—12Nd—6La; other composite oxide will be described in the same manner) in Inventive Example 7, and Zr—12Nd—6Pr in Inventive Example 16, wherein these samples were subjected to an aging treatment under an ambient atmosphere at 800° C. for 24 hours. As seen in the graphs of FIGS. 8 and 9, a sharp peak appears. This proves that a crystal configuration in each of the composite oxides is adequately maintained. That is, the Zr—Nd—R based composite oxide can maintain its crystal structure even after it undergoes a high-temperature aging treatment equivalent to an environment where it is exposed to engine exhaust gas. This allows the Zr—Nd—R based composite oxide to maintain its oxygen ion conductivity and avoid deterioration in performance as a catalytic material.

As above, in this embodiment, the Zr—Nd—R based composite oxide selected as the composite oxide makes it possible to reduce a decreasing rate of a BET specific surface area and adequately maintain the crystal configuration so as to obtain further enhanced catalytic function contributing to an exhaust gas conversion reaction and thereby achieve further enhanced exhaust gas conversion performance.

(C) Evaluation Test on Oxygen Absorbing/Releasing Capability

In addition to the above evaluation tests on carbon-particulate burning performance and catalyst properties, the inventors carried out an evaluation test on oxygen absorbing/releasing capability in two types of Zr—Nd—R based composite oxides (Zr—6Nd—6Pr in Inventive Example 13 in FIG. 6, and Zr—12Nd—18Pr—3La in Inventive Example 20 in FIG. 6).

The oxygen absorbing/releasing capability was measured as follows.

1.0 wt % of platinum (Pt) was supported on each of the samples, and then the Pt-supporting sample was subjected to an aging treatment at 800° C. and atmospheric pressure for 24 hours. 100 mg of the aged sample was set in a fixed-bed flow reactor. Under this condition, a temperature of the sample was increased from room temperature up to 600° C. at a temperature rise rate of 30° C./min while supplying He balance gas containing 5 volume % of oxygen gas at a flow rate of 100 cc/min to allow the sample to absorb oxygen.

Figure 10:
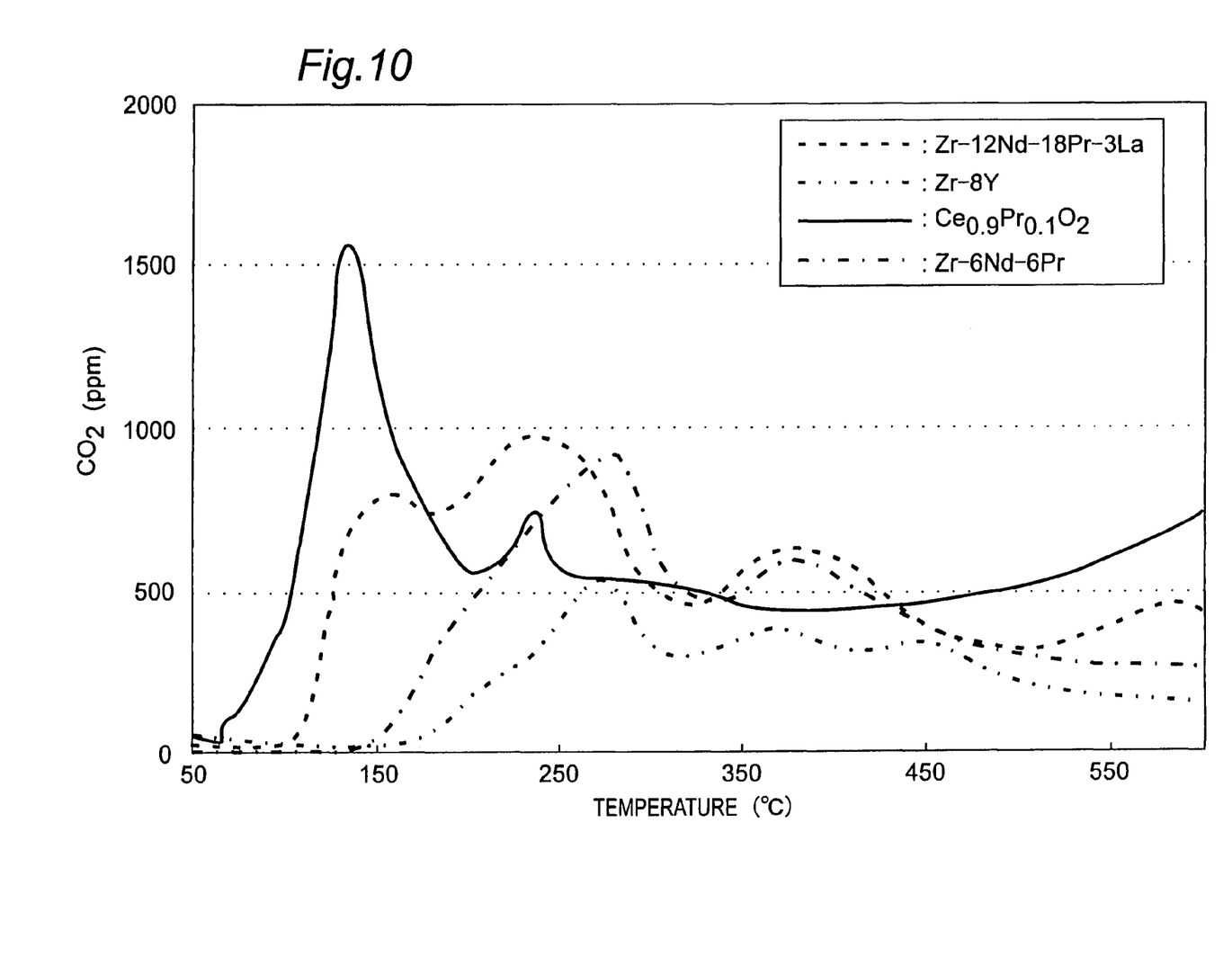
FIG. 10 is a graph showing a relationship between a temperature and an oxygen absorbing/releasing capability, in various composite oxides.

Then, the temperature was held at 600° C. for 5 minutes, and then cooled down to room temperature while supplying the gas. Subsequently, the oxygen-containing He balance gas was changed to He balance gas containing 2 volume % of CO gas, and the temperature was increased from room temperature up to 600° C. at a temperature rise rate of 20° C./min while supplying the CO-containing He balance gas at a flow rate of 100 cc/min. During this process, oxygen stored in the sample is released, and the released oxygen reacts with the CO to generate $CO_2$. FIG. 10 is a graph showing an amount of $CO_2$ generated during the above process.

Specifically, the graph in FIG. 10 shows a relationship between the temperature and the oxygen absorbing/releasing capability in each of the samples. FIG. 10 also shows a relationship between the temperature and the oxygen absorbing/releasing capability in each of a zirconium-yttrium composite oxide (Zr—8Y) and a cerium based oxide (a composite oxide: $Ce_{0.9} Pr_{0.1} O_2$, containing, as metal elements, 90 mol % of Ce and 10 mol % of Pr), as comparative examples.

As seen in the data, the two types of Zr—Nd—R based composite oxides had higher oxygen absorbing/releasing capability over the entire temperature range, as compared with the Zr—8Y as one of the comparative examples. Further, it was verified that the Zr—6Nd—6Pr corresponding to Inventive Example 13 in FIG. 6, and the Zr—12Nd—18Pr—3La corresponding to Inventive Example 20 in FIG. 6, have higher oxygen absorbing/releasing capability, respectively, in a temperature range of about 200 to 330° C. and in a temperature range of about 180 to 300° C., as compared with the cerium based oxide having an oxygen absorbing/releasing capability as is well known. These temperature ranges correspond to a temperature range where a catalytic activity of the catalytic noble metal is gradually increased. Thus, the composite oxide having an oxygen absorbing/releasing capability in such a temperature range is valuable for use in an exhaust gas component purifying catalyst intended to purify HC, CO and NOx. That is, it can be said that an exhaust gas component purifying catalytic material containing the Zr—Nd—R based composite oxide, such as the sample in Inventive Example 13 or 20, is valuable as a catalytic material for not only a catalyst for burning carbon particulates, but also a three-way catalyst, a lean NOx catalyst and a diesel oxidation catalyst.

(D) Evaluation Test on NOx Conversion Performance

In addition to the evaluation tests on carbon-particulate burning performance, catalyst properties and oxygen absorbing/releasing capability, the inventers carried out an evaluation test on NOx conversion performance for five types of Zr—Nd—R based composite oxides (Zr—3Nd—6La corresponding to Inventive Example 1 in FIG. 6, Zr—12Nd—12La corresponding to Inventive Example 8 in FIG. 6, Zr—12Nd—12Pr corresponding to Inventive Example 17 in FIG. 6, Zr—12Nd—18Pr corresponding to Inventive Example 18 in FIG. 6, and Zr—12Nd—18Pr—3La corresponding to Inventive Example 20 in FIG. 6).

The NOx conversion performance was measured as follows.

Each of the Zr—Nd—R based composite oxides was mixed with alumina in a mass ratio of 1:1 (i.e., alumina:Zr—Nd—R based composite oxide=1:1 (mass ratio)), water and binder, to form a slurry. The slurry was sucked in a honeycomb support made of cordierite and formed as the filter body 6, and an excess part of the slurry was removed through air-blowing, so that the slurry was wash-coated on the honeycomb support. Then, the slurry on the honeycomb support was dried and calcinated to form a first wash coat layer on the honeycomb support. The first wash coat layer was set at 270 g/L (i.e., 270 g per L of the honeycomb support), and the honeycomb support had a cell density of 4.5 mil/400 cpsi.

Then, Rh-supporting alumina (i.e., alumina on which Rh serving as a catalytic metal is supported), water and binder were mixed together to form a slurry. The slurry was sucked in the honeycomb support formed with the first wash coat layer, and an excess part of the slurry was removed through air-blowing, so that the slurry was wash-coated on the honeycomb support. Then, the slurry on the honeycomb support was dried and calcinated to form a second wash coat layer on the first wash coat layer on the honeycomb support. The Rh serving as a catalytic metal was supported on the alumina in an amount of 0.5 g/L, and the second wash coat layer was set at 50 g/L.

Then, the honeycomb support formed with the first and second wash coat layers was immersed in an aqueous acetate solution containing barium and strontium which serve as a NOx trapping material adapted to trap NOx contained in exhaust gas, to impregnate each of the first and second wash coat layers with barium acetate and strontium acetate, and then dried and calcinated to form a first catalyst layer and a second catalyst layer on the honeycomb support. Then, the honeycomb support formed with the first and second catalyst layers was immersed in a nitric acid solution of dinitrodiamine platinum, and then dried and calcinated to allow platinum serving as a catalytic metal to be supported by the Zr—Nd—R based composite oxide and the alumina. The Pt serving as a catalytic metal was contained in an amount of 2 g/L, and the barium and the strontium were contained in an amount of 30 g/L and in an amount of 10 g/L, respectively.

Figure 11:
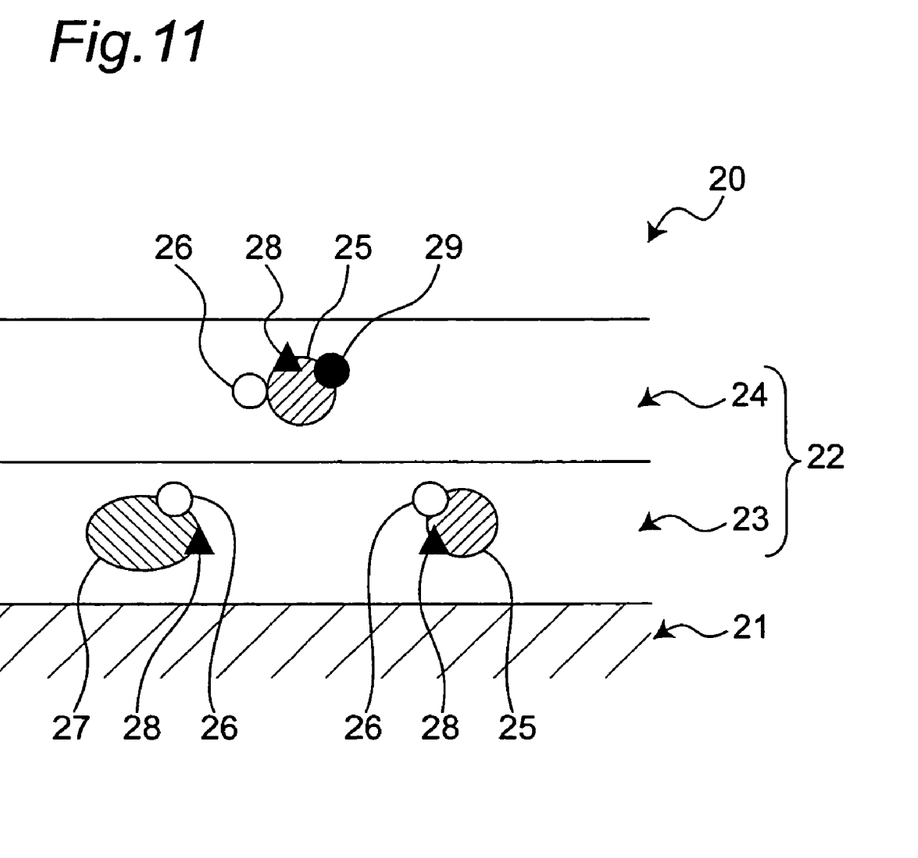
FIG. 11 is an explanatory sectional view schematically showing a catalyst layer composed of two layers and formed on a honeycomb support in a sample for evaluating NOx conversion performance.

FIG. 11 is an explanatory sectional view schematically showing a catalyst layer composed of two layers and formed on a honeycomb support in a sample for evaluating NOx conversion performance. As shown in FIG. 11, the NOx-conversion-performance evaluation sample 20 prepared in the above manner comprises catalyst layer 22 on the side of honeycomb support 21, more specifically, a first catalyst layer (i.e., lower layer) 23 on the side of a honeycomb support 21 and a second catalyst layer (i.e., upper layer) 24 facing an exhaust gas channel through which exhaust gas flows. The first catalyst layer 23 contains alumina 25 serving as an oxide particle having a high specific surface area, platinum 26, serving as a catalytic metal, a Zr—Nd—R based composite oxide 27, and a NOx trapping material 28. The platinum 26 and the NOx trapping material 28 are supported by each of the Zr—Nd—R based composite oxide 27 and the alumina 25. The second catalyst layer 24 contains alumina 25, Rh 29 and Pt 26 each serving as a catalytic metal, and a NOx trapping material 28. The Rh 29, the Pt 26 and the NOx trapping material 28 are supported by the alumina 25.

Further, four types of comparative samples were prepared using one type of Zr-based oxide (Zr—20Pr) and three types of Zr—Nd based oxides (Zr—12Nd corresponding to Comparative Example 3 in FIG. 6, Zr—20Nd corresponding to Comparative Example 4 in FIG. 6 and Zr—1Nd—8La, in place of the aforementioned Zr—Nd—R based composite oxides, and in the same manner as that in the samples of the aforementioned Zr—Nd—R based composite oxides.

(Evaluation Test on NOx Conversion Performance)

Each of the evaluation samples obtained in the above manner was subjected to an aging treatment under an ambient atmosphere at 750° C. for 24 hours, and each of the aged samples was set in a model-gas flow-type catalyst evaluation apparatus designed to supply model gas as a substitute for exhaust gas, so as to carry out a NOx conversion evaluation test for evaluating NOx conversion performance.

The model gas was prepared to have gas components as shown in the following Table 2 so as to form lean model gas set at an air-fuel ratio of 28 (A/F=28) and rich model gas set at air-fuel ratio of 14 (A/F=14). The lean model gas and the rich model gas were maintained at a predetermined temperature, and supplied alternately at one-minute intervals, to measure a NOx conversion efficiency in the lean model gas (i.e., when the lean model gas is supplied). In this test, a space velocity SV of the model gas was set at of 30,000/h, and the predetermined temperature of the model gas was set at 200° C., 250° C. and 300° C.

TABLE 2

| Gas Component | Concentration (%) | |
| --- | --- | --- |
| | Lean (A/F = 28) | Rich (A/F = 14) |
| NO | 0.026 | 0.026 |
| HC | 0.04 | 0.4 |
| CO | 0.16 | 1.00 |
| $O_2$ | 10.00 | 0.50 |
| $CO_2$ | 6.00 | 6.00 |
| $H_2O$ | 7.00 | 7.00 |
| $N_2$ | Balanced | Balanced |

Figure 12:
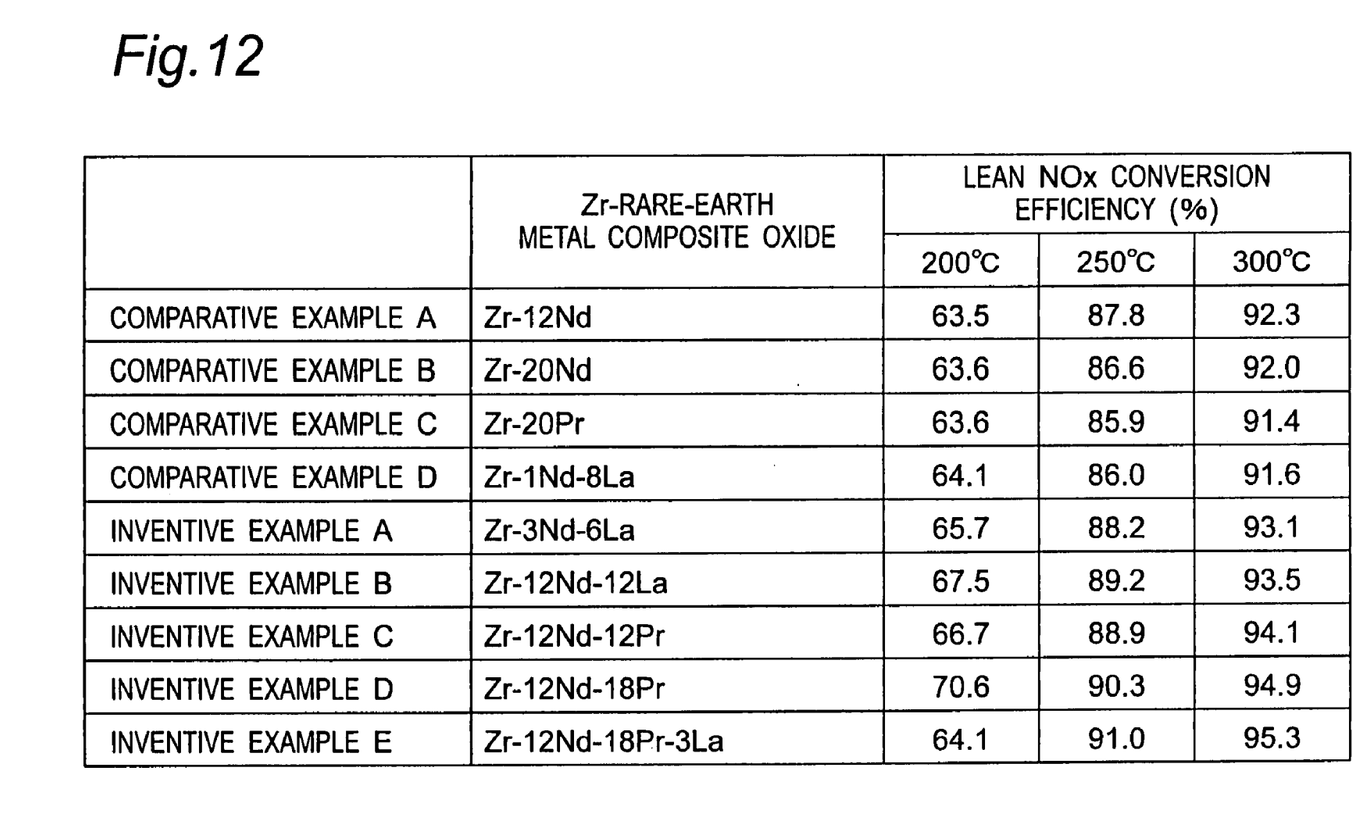
FIG. 12 is a table showing a measurement result of NOx conversion performance.

FIG. 12 is a table showing a measurement result of NOx conversion performance. As shown in FIG. 12, at any temperature of 200° C., 250° C. and 300° C., each of Inventive Examples A, B, C, D and E exhibits a higher NOx conversion efficiency in the lean model gas than those of Comparative Examples A, B, C and D. This verifies that Inventive Examples are superior to Comparative Examples in terms of conversion efficiency of NOx in exhaust gas.

As above, in an exhaust gas component purifying catalyst comprising a catalyst support substrate having thereon a catalyst layer which contains the Zr—Nd—R based composite oxide in such a manner that a ratio of $Nd_2O_3/(ZrO_2+Nd_2O_3+RO)$ is 3 mol % or more, and a ratio of $(Nd_2O_3+RO)/(ZrO_2+Nd_2O_3+RO)$ is 33 mol % or less, the catalyst layer may comprise a first catalyst layer (i.e., lower layer) and a second catalyst layer (i.e., upper layer). In this case, the first catalyst layer may contain the Zr—Nd—R based composite oxide, and each of the first and second layers may contain alumina, Pt and a NOx trapping material, so that the catalyst can effectively purify NOx during lean exhaust gas conditions.

In the above exhaust gas component purifying catalyst, the Zr—Nd—R based composite oxide contained in the first catalyst layer has high oxygen ion conductivity to exhibit excellent oxygen exchange reaction for incorporating oxygen in an exhaust gas atmosphere and releasing active oxygen during lean exhaust gas conditions. Thus, the Zr—Nd—R based composite oxide can promote an oxidation reaction of NOx to be trapped, and traps the NOx in the form of nitrate, so as to provide enhanced NOx conversion performance. In addition, the Zr—Nd—R based composite oxide having base properties can easily incorporate NOx and effectively trap the NOx. In a process of reducing tapped NOx during rich exhaust gas conditions, an amount of oxygen to be released from the Zr—Nd—R based composite oxide in the above exhaust gas component purifying catalyst is less than that to be released from a Ce-based composite oxide. This makes it possible to effectively purify the NOx without hindering the NOx reduction reaction.

In a process of de-trapping NOx trapped in the second layer, most of the NOx will pass through the second layer containing alumina on which rhodium and platinum are supported. This makes it possible to promote effective reduction/conversion of the de-trapped NOx, based on the Rh capable of promoting a NOx reduction reaction, so as to further reliably obtain the above effects.

In the above examples, the Zr—Nd—R based composite oxide is contained in only the first catalyst layer (i.e., lower catalyst layer) located under the second catalyst layer (i.e., upper catalyst layer) facing the exhaust gas channel. Alternatively, the Zr—Nd—R based composite oxide may also be contained in the second catalyst layer (i.e., upper catalyst layer). In the above examples, barium and strontium are used as the NOx trapping material. Alternatively, any suitable alkaline-earth metal other than barium and strontium, any alkali metal, such as potassium, lithium or sodium, or a rare-earth metal, such as cerium, lanthanum or praseodymium, may be used as the NOx trapping material.

In the above examples, the two catalyst layers are formed on the catalyst support substrate. When three or more catalyst layers are formed in the catalyst support substrate, a lower layer located under an upper layer facing the exhaust gas channel may contain the composite oxide, and each of the catalyst layers may contain an oxide particle having a high specific surface area, platinum (Pt) serving as the catalytic metal, and a NOx trapping material adapted to trap NOx, to obtain the same effects.

An advantageous embodiment of the invention has been shown and described. It is obvious to those skilled in the art that the present invention is not limited to the specific embodiment, but various modifications changes in design may be made therein without departing from the spirit and scope thereof as set forth in appended claims. For example, while the above embodiment has been described based on one example where a wall flow-type particulate filter is used as the DPF, the DPF in the present invention is not limited to such a type, but may be a three-dimensional mesh-type particulate filter. Further, in view of the oxygen ion conductivity variable for burning of carbon particulates, and the oxygen absorbing/releasing capability, the composite oxide in the present invention may be contained in a diesel oxidation catalyst layer or lean NOx catalyst layer on a straight-flow honeycomb support which is disposed upstream of a DPF and on which PM is accumulated.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A catalyst to purify an exhaust gas component, said catalyst comprising:
a particulate filter as a catalyst support substrate having thereon a catalyst layer which contains a composite oxide, wherein
the composite oxide does not contain cerium and does contain zirconium (Zr) and neodymium (Nd) as essential components and a rare-earth metal R other than cerium (Ce) and neodymium (Nd);
each of said zirconium, neodymium and rare-earth metal R constituting said composite oxide is contained, in the form of an oxide, in such a manner that a ratio of $Nd_2O_3/(ZrO_2+Nd_2O_3+RO)$ is 3 mol % or more, a ratio of $(Nd_2O_3+RO)/(ZrO_2+Nd_2O_3+RO)$ is 33 mol % or less, and a ratio of $RO/(ZrO_2+Nd_2O_3+RO)$ is 12 mol % or more, wherein an oxide of rare-earth metal R is expressed as RO; and
platinum (Pt) is supported on the composite oxide.

2. The catalyst according to claim 1, wherein said rare-earth metal R is at least one selected from the group consisting of yttrium (Y), ytterbium (Yb), scandium (Sc), lanthanum (La), praseodymium (Pr) and samarium (Sm).

* * * * *